(12) United States Patent
Glikson et al.

(10) Patent No.: US 8,782,323 B2
(45) Date of Patent: Jul. 15, 2014

(54) DATA STORAGE MANAGEMENT USING A DISTRIBUTED CACHE SCHEME

(75) Inventors: Alex Glikson, Haifa (IL); Shay Goikhman, Haifa (IL); Benny Rochwerger, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 12/609,023

(22) Filed: Oct. 30, 2009

(65) Prior Publication Data

US 2011/0138102 A1 Jun. 9, 2011

(51) Int. Cl.
*G06F 9/00* (2006.01)
*G06F 12/00* (2006.01)
*G06F 9/455* (2006.01)
*G06F 12/10* (2006.01)

(52) U.S. Cl.
CPC .......... *G06F 9/45533* (2013.01); *G06F 12/109* (2013.01); *G06F 12/1036* (2013.01)
USPC .......................................................... 711/6

(58) Field of Classification Search
USPC .......................................................... 711/6
See application file for complete search history.

(56) References Cited

U.S. PATENT DOCUMENTS

| | | | | |
|---|---|---|---|---|
| 5,809,536 | A * | 9/1998 | Young et al. ................... | 711/144 |
| 6,389,513 | B1 * | 5/2002 | Closson ........................ | 711/129 |
| 6,973,542 | B1 * | 12/2005 | Schmuck et al. ............. | 711/137 |
| 7,240,162 | B2 | 7/2007 | de Vries et al. | |
| 2002/0029326 | A1 * | 3/2002 | Reuter et al. .................. | 711/206 |
| 2008/0077576 | A1 | 3/2008 | Ozveren et al. | |
| 2009/0210875 | A1 * | 8/2009 | Bolles et al. ...................... | 718/1 |

OTHER PUBLICATIONS

Jiangchuan Liu, "Streaming Media Caching".
Ying Cai, "Video Management in Peer to Peer system".
Alan T.S. Ip, "COPACC: An Architecture of Cooperative Proxy-Client Caching System for On-Demand Media Streaming", 2007.
James Z. Wang, "Design and Implementation of a P2P Cooperative Proxy Cache System", 2005.
Sanjay Ghemawat, "The Google File System", 2003.
M.M. Akon, "Low Cost Peer-to-Peer Collaborative Cashing for Clusters", 2007.
Y. Xhang, "PIBUS: A Network Memory-Based Peer-to-Peer IO buffering Service", 2007.

* cited by examiner

*Primary Examiner* — Matthew Bradley
*Assistant Examiner* — Craig Goldschmidt
(74) *Attorney, Agent, or Firm* — Jason Far-hadian; Century IP

(57) ABSTRACT

A method for accessing data stored in a distributed storage system is provided. The method comprises determining whether a copy of first data is stored in a distributed cache system, where data in the distributed cache system is stored in free storage space of the distributed storage system; accessing the copy of the first data from the distributed cache system if the copy of the first data is stored in a first data storage medium at a first computing system in a network; and requesting a second computing system in the network to access the copy of the first data from the distributed cache system if the copy of the first data is stored in a second data storage medium at the second computing system. If the copy of the first data is not stored in the distributed cache system, the first data is accessed from the distributed storage system.

24 Claims, 9 Drawing Sheets

DATA STORAGE MANAGEMENT USING A DISTRIBUTED CACHE SCHEME

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to distributed storage systems and, more particularly, to managing a distributed storage system using a distributed cache scheme.

BACKGROUND

A data cache may be utilized to provide faster access to data stored in a data storage system. Typically, a cache refers to a smaller, faster storage medium that stores copies of data stored in a relatively larger, slower data storage system. Since the cache is smaller than the data storage system, existing copies of data generally need to be removed from the cache to make room for new copies of data to be imported into the cache.

SUMMARY

The present disclosure is directed to systems and corresponding methods that facilitate data storage management using a distributed cache scheme.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for accessing data stored in a distributed storage system is provided. The method comprises determining whether a copy of first data is stored in a distributed cache system, where data in the distributed cache system is stored in free storage space of the distributed storage system; accessing the copy of the first data from the distributed cache system if the copy of the first data is stored in a first data storage medium at a first computing system in a network; and requesting a second computing system in the network to access the copy of the first data from the distributed cache system if the copy of the first data is stored in a second data storage medium at the second computing system. If the copy of the first data is not stored in the distributed cache system, the first data is accessed from the distributed storage system.

In accordance with one embodiment, a method for accessing data stored in a distributed storage system is provided. The method comprises determining whether a copy of first data is stored in a distributed cache system, where data in the distributed cache system is stored in free storage space of the distributed storage system; accessing the copy of the first data from the distributed cache system if the copy of the first data is stored in a first virtual memory allocated to a first virtual machine (VM) in a network; and requesting a second VM in the network to access the copy of the first data from the distributed cache system if the copy of the first data is stored in a second virtual memory allocated to the second VM. If the copy of the first data is not stored in the distributed cache system, the first data is accessed from the distributed storage system.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

In existing networks, data stored in a distributed storage system may be accessed by a plurality of computing systems. Unfortunately, the time to access data stored in the distributed storage system (i.e., latency) may increase as the number of computing systems sharing access to data stored in the distributed storage system increases. Additionally, data stored in the distributed storage system may be accessed in a non-secure manner Systems and methods are needed to overcome the above-mentioned shortcomings.

Figure 1:
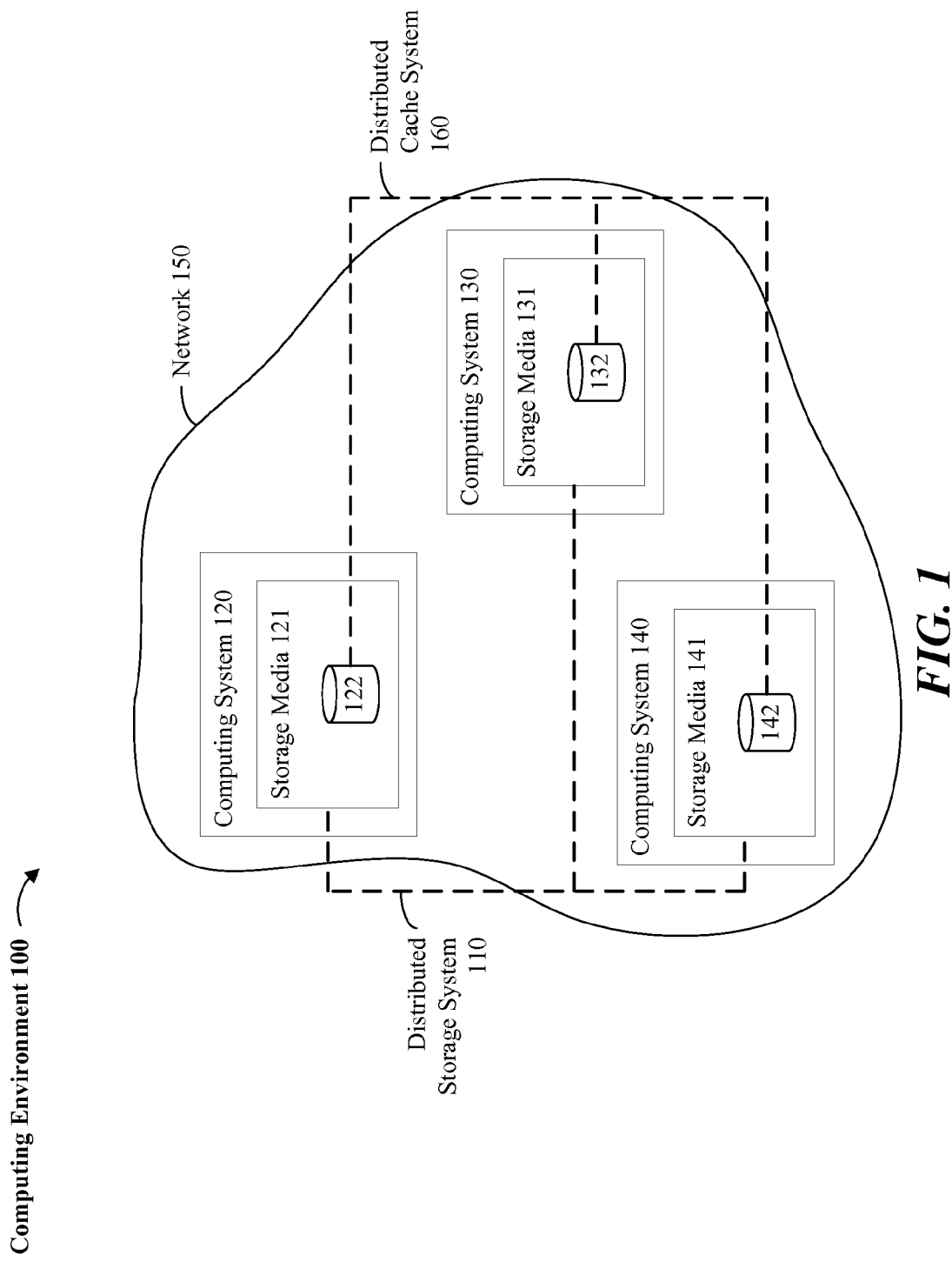
FIG. 1 illustrates an exemplary computing environment, in accordance with one or more embodiments.

Referring to FIG. 1, in accordance with one or more embodiments, an exemplary computing environment 100 may comprise a distributed storage system 110 accessible by one or more computing systems 120, 130, 140 connected in a network 150 (e.g., a peer-to-peer network). The distributed storage system 110 comprises one or more storage media 121, 131, 141, which are located at computing systems 120, 130, 140, respectively.

Computing systems 120, 130, 140 may collaboratively manage or utilize services provided by a distributed cache system 160. In one embodiment, the distributed cache system 160 may enable computing systems 120, 130, 140 to share storage space in the distributed storage system 110. For example, if storage media 121 does not have sufficient storage space to store certain data, that data may be stored (i.e., cached) in free storage space of storage media 131 or 141. In other words, the distributed cache system 160 may comprise one or more cache volumes 122, 132, 142, which are storage volumes of storage media 121, 131, 141, respectively.

In another embodiment, the distributed cache system 160 may also enable multiple copies of data to be stored in the distributed storage system 110 to increase access rate or availability of the data. For example, if a certain data is stored in storage media 121, one or more copies of that data may be stored (i.e., cached) in cache volume 132 of storage media 131 or cache volume 142 of storage media 141.

The distributed cache system 160 may further comprise metadata for managing caching of data in the distributed storage system 110. In one embodiment, the cache metadata may comprise mapping information associating copies of data stored in cache volumes 122, 132, 142 with data stored in non-cache volumes of the distributed storage system 110. The cache metadata may further comprise information for identifying computing systems in the network 150 and the amount of free storage space in their respective storage media.

It is noteworthy that the cache metadata may be propagated to other computing systems managing or utilizing the distributed cache system 160 when the cache metadata is updated. For example, if computing system 120 updates the cache metadata stored in cache volume 122 of storage media 121, computing system 120 may forward information for updating the cache metadata to computing systems 130 and 140.

Figure 2:
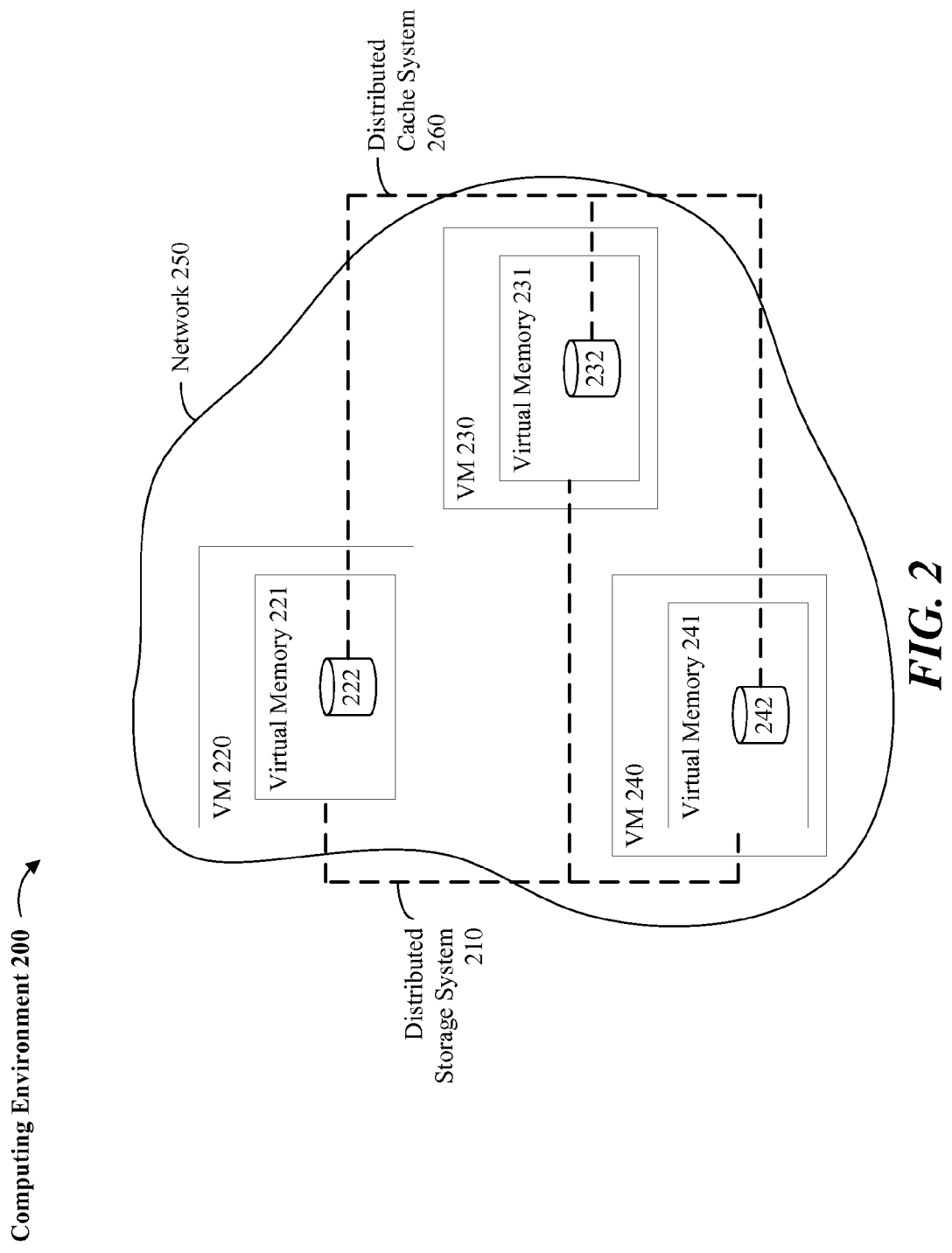
FIG. 2 illustrates an exemplary computing environment comprising one or more virtual machines, in accordance with one or more embodiments.

Referring to FIG. 2, in accordance with other embodiments, an exemplary computing environment 200 may comprise a distributed storage system 210 accessible by one or more virtual machines (VMs) 220, 230, 240 or a combination of non-virtual and virtual computing systems (not shown) connected in a network 250 (e.g., a peer-to-peer network). A VM refers to a virtualization layer implemented by a hypervisor (i.e., host software) executed on top of other software or the underlying hardware platform.

The distributed storage system 210 comprises one or more virtual memories 221, 231, 241, which are allocated to VMs 220, 230, 240, by their respective hypervisors. A virtual memory refers to a portion of storage space associated with a VM such that an application running on the VM is provided with the impression that the virtual memory is a physical memory (i.e., a storage medium).

The hypervisors may collaboratively manage or utilize services provided by a distributed cache system 260. In one embodiment, the distributed cache system 260 may enable VMs 220, 230, 240 to share storage space in the distributed storage system 210. For example, if virtual memory 221 does not have sufficient storage space to store certain data, that data may be stored (i.e., cached) in free storage space of virtual memory 231 or 241. In other words, the distributed cache system 260 may comprise one or more cache volumes 222, 232, 242, which are storage volumes of virtual memories 221, 231, 241, respectively.

In another embodiment, the distributed cache system 260 may also enable multiple copies of data to be stored in the distributed storage system 210 to increase access rate or availability of the data. For example, if a certain data is stored in virtual memory 221, one or more copies of that data may be stored (i.e., cached) in cache volume 232 of virtual memory 231 or cache volume 242 of virtual memory 241.

The distributed cache system 260 may further comprise metadata for managing caching of data in the distributed storage system 210. In one embodiment, the cache metadata may comprise mapping information associating copies of data stored in cache volumes 222, 232, 242 with data stored in non-cache volumes of the distributed storage system 210. The cache metadata may further comprise information for identifying VMs in the network 250 and the amount of free storage space in their respective virtual memories.

It is noteworthy that the cache metadata may be propagated to other computing systems managing or utilizing the distributed cache system 260 when the cache metadata is updated. For example, if computing system 220 updates the cache metadata stored in cache volume 222 of storage media 221, computing system 220 may forward information for updating the cache metadata to computing systems 230 and 240.

Referring to FIGS. 1 and 2, in accordance with certain embodiments, the distributed storage systems 110, 210 may be configured to have a primary volume and one or more secondary volumes. A primary volume (e.g., a golden volume) refers to a self-sufficient storage volume that is not dependent on data stored in another storage volume. As used herein, a secondary volume (e.g., a clone volume) refers to a storage volume that is limited to storing updated copies of data.

If a computing system detects an update (i.e., a write operation) directed to data stored in the primary volume, the computing system diverts the update to a secondary volume. In other words, an updated copy of the data is stored in the secondary volume, but the data stored in the primary volume is not updated. This diversion scheme is referred to as copy-on-write. The cache metadata in such embodiments may comprise mapping information associating updated copies of data stored in the secondary volumes with data stored in the primary volume.

It should be understood that the processes provided below are described with reference to the computing environment 100 for purposes of example. In other embodiments, such processes may also be applicable to the computing environment 200 or other computing environments comprising a distributed storage system.

Figure 3:
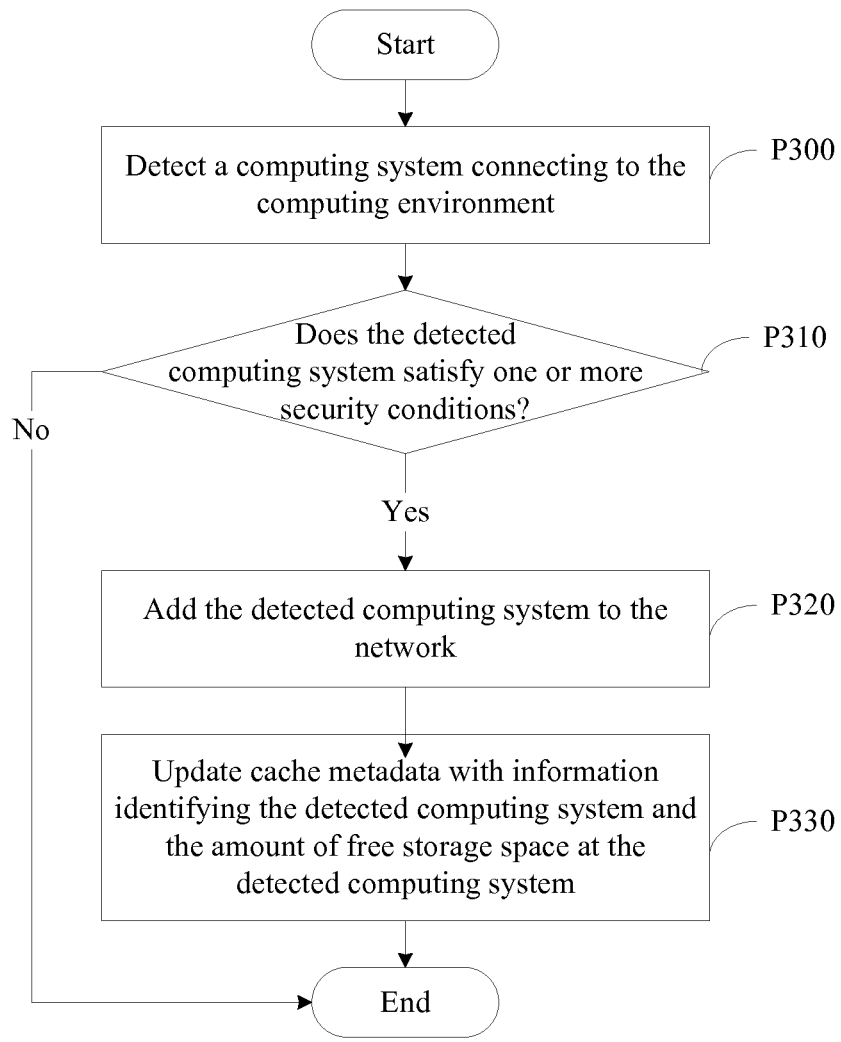
FIG. 3 is a flow diagram of a method for adding a computing system to a network, in accordance with one embodiment.

Referring to FIGS. 1 and 3, in accordance with one embodiment, the network 150 may be configured as a secure network such that access to the distributed storage system 110 is limited to computing systems in the network 150 (e.g., computing systems 120, 130, 140). A computing system in the network 150 (e.g., computing system 120) may detect another computing system connecting to the computing environment 100 (P300).

If the detected computing system satisfies one or more security conditions (e.g., provides a valid security certificate or password), computing system 120 adds the detected computing system to the network 150 (P310, P320). Computing systems 120 also updates the cache metadata with information identifying the detected computing system and the amount of free storage space in storage media located at the detected computing system (P330).

Figure 4:
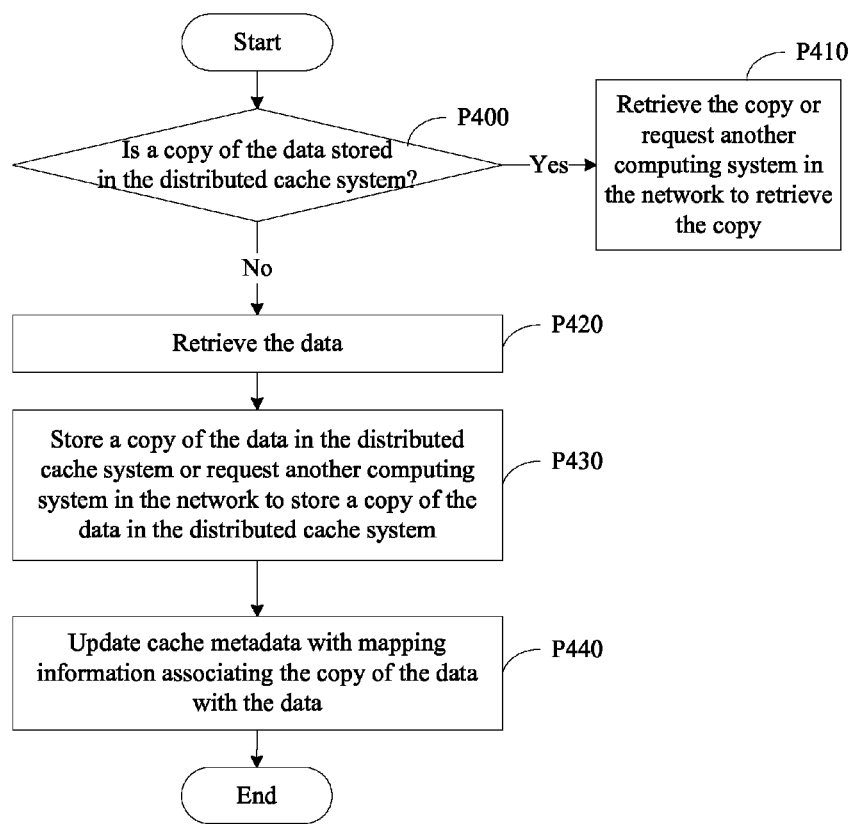
FIG. 4 is a flow diagram of a method for reading data stored in a distributed storage system, in accordance with one embodiment.

Referring to FIGS. 1 and 4, in accordance with one embodiment, a computing system in the network 150 (e.g., computing system 120) may read data stored in the distributed storage system 110. In order to read the data, computing system 120 may utilize mapping information included in the cache metadata to determine whether a copy of the data is stored in the distributed cache system 160 (P400).

If a copy of the data is stored in the distributed cache system 160, computing system 120 retrieves the copy or requests another computing system in the network 150 (e.g., computing system 130) to retrieve the copy (P410). For example, if the copy is stored locally in cache volume 122 of storage media 121, computing system 120 retrieves the copy. If the copy is stored remotely in cache volume 132 of storage media 131, computing system 120 requests computing system 130 to retrieve the copy.

If a copy of the data is not stored in the distributed cache system 160, computing system 120 retrieves the data from non-cache volumes of the distributed storage system 110 (P420). Computing system 120 also stores a copy of the data in the distributed cache system 160 or requests another computing system in the network 150 (e.g., computing system 130) to store a copy of the data in the distributed cache system 160, as provided in further detail below (P430). Upon storing a copy of the data in the distributed cache system 160, computing system 120 updates the cache metadata with mapping information associating the copy of the data with the data (P440).

For example, computing system 120 may store a copy of the data in local cache volume 122 of storage media 121 if there is sufficient storage space available in storage media 121. Otherwise, computing system 120 may utilize information included in the cache metadata to identify computing system 130, a computing system in the network 150 that has sufficient storage space available, and request computing system 130 to store a copy of the data in remote cache volume 132 of storage media 131. Alternatively, an existing copy of data may be removed from the local or a remote cache volume, and a copy of the new data may be stored in the cache volume from which the existing copy was removed.

Figure 5:
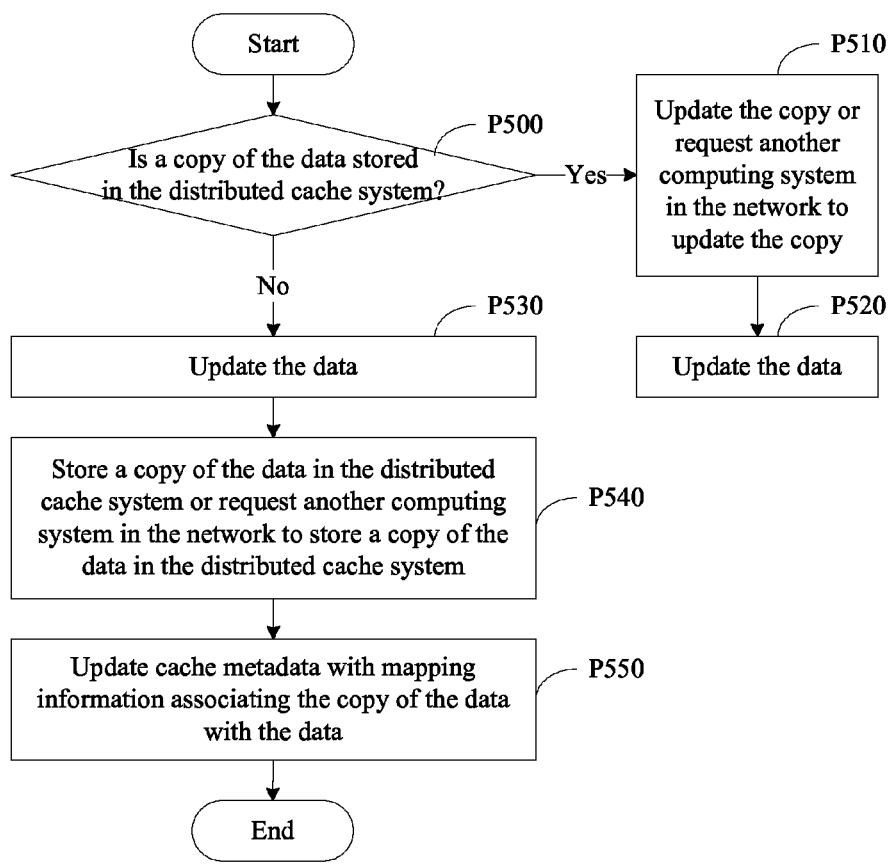
FIG. 5 is a flow diagram of a method for updating data stored in a distributed storage system, in accordance with one embodiment.

Referring to FIGS. 1 and 5, in accordance with one embodiment, a computing system in the network 150 (e.g., computing system 120) may update data stored in the distributed storage system 110. In order to update the data, computing system 120 may utilize mapping information included in the cache metadata to determine whether a copy of the data is stored in the distributed cache system 160 (P500).

If a copy of the data is stored in the distributed cache system 160, computing system 120 updates the copy or requests another computing system in the network 150 (e.g., computing system 130) to update the copy (P510). For example, if the copy is stored locally in cache volume 122 of storage media 121, computing system 120 updates the copy. If the copy is stored remotely in cache volume 132 of storage media 131, computing system 130 requests computing system 130 to update the copy.

Once the copy of the data is updated, computing system 120 may also update the data, which is stored in a non-cache volume of the distributed storage system 110 (P520). Depending on implementation, the data may be updated synchronously (i.e., upon updating the copy of the data) or asynchronously (i.e., at a later, predetermined time).

If a copy of the data is not stored in the distributed cache system 160, computing system 120 updates the data, which is stored in a non-cache volume of the distributed storage system 110 (P530). Upon updating the data, computing system 120 stores a copy of the data in the distributed cache system 160 or requests another computing system in the network 150 (e.g., computing system 130) to store a copy of the data in the distributed cache system 160, as provided earlier (P540). Once a copy of the data is stored in the distributed cache system 160, computing system 120 updates the cache metadata with mapping information associating the copy of the data with the data (P550).

In certain embodiments, the distributed storage system 110 may be accessed by multiple computing systems in the network 150. That is, access to one or more data stored in the distributed storage system 110 may be shared between more than one computing system in the network 150. In such embodiments, a computing system in the network 150 may ensure data consistency by synchronizing access to the distributed storage system 110, as provided in further detail below.

Figure 6:
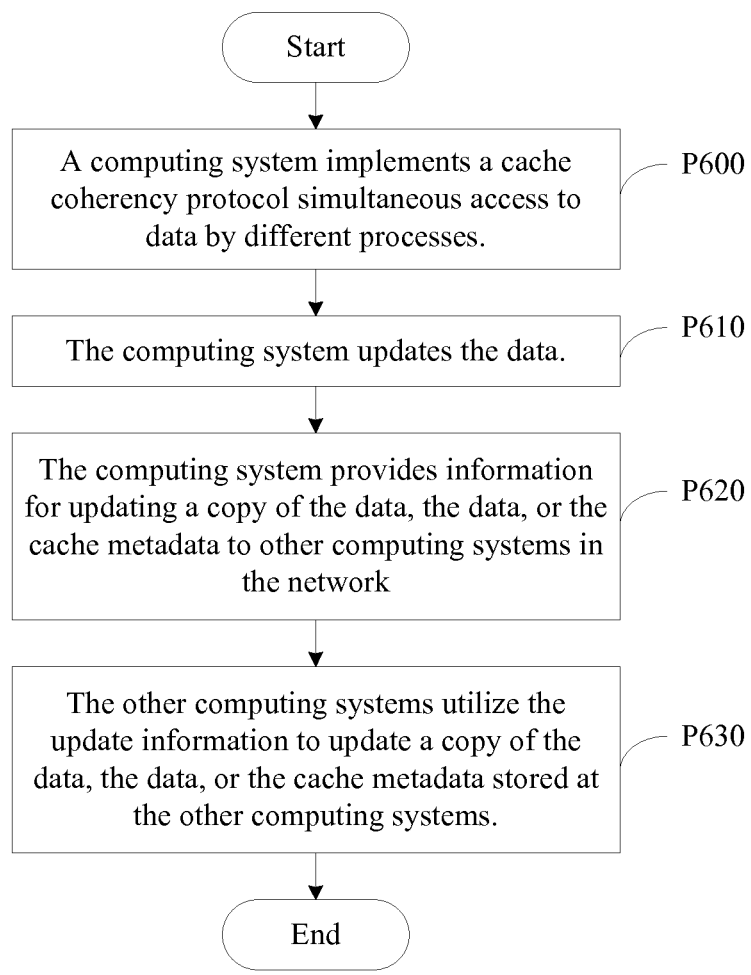
FIG. 6 is a flow diagram of a method for updating shared data stored in a distributed storage system, in accordance with one embodiment.

Referring to FIGS. 1 and 6, in accordance with one embodiment, a computing system in the network 150 (e.g., computing system 120) may update shared data stored in the distributed storage system 110. In order to update the data, computing system 120 may implement a cache coherency protocol to prevent simultaneous access to the data by different processes (P600). The protocol may enforce exclusive ownership over a target storage space or by way of other means that accomplish the intended purpose.

Once the data is updated, computing system 120 provides (e.g., by broadcast, multicast, etc.) update information to other computing systems in the network 150 (P610, P620). Depending on implementation, the update information may comprise information for updating a copy of the data, the data, or the cache metadata. Upon receiving the information, the other computing systems may utilize the update information to update a copy of the data, the data, or the cache metadata stored at the other computing systems (P630).

In certain embodiments, the distributed storage system 110 may be configured to have a primary volume and one or more secondary volumes associated with the primary volume. Each of the computing systems in the network 150 may perform a boot sequence utilizing data stored in the primary volume. A boot sequence refers to an initial set of operations that a computing system performs when power is switched on. Or, in the case of VMs, a boot sequence refers to an initial set of operations that a VM performs when the VM is implemented by a hypervisor.

Figure 7:
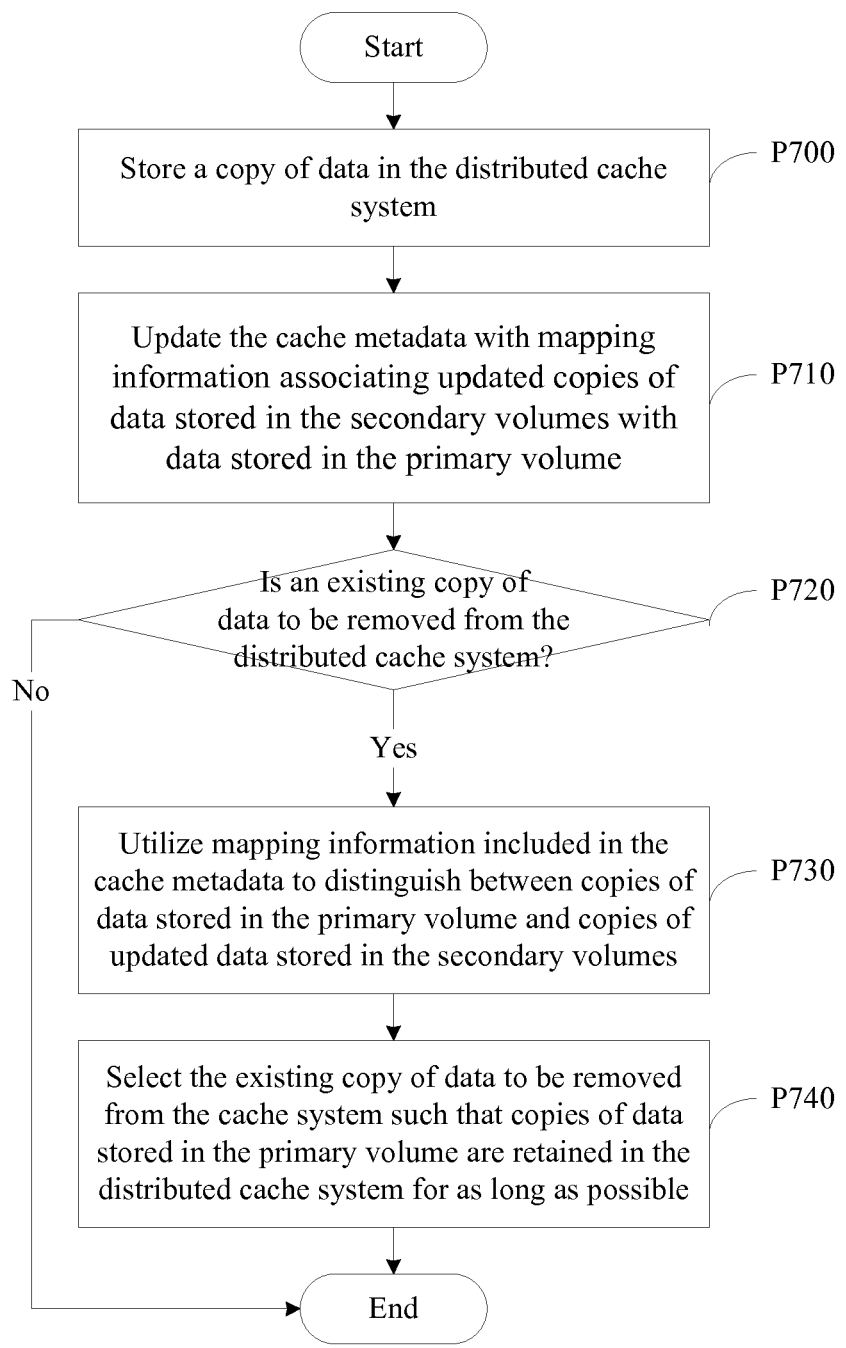
FIG. 7 is a flow diagram of a method for caching data stored in a primary volume or a secondary volume associated with the primary volume, in accordance with one embodiment.

Referring to FIGS. 1 and 7, a computing system in the network 150 (e.g., computing system 120) may store a copy of data in the distributed cache system 160 (P700). Upon storing the copy of the data, the computing system 120 may update the cache metadata with mapping information associating updated copies of data stored in the secondary volumes with data stored in the primary volume (P710). If an existing copy of data is to be removed from the distributed cache system 160, computing system 120 utilizes mapping information included in the cache metadata to distinguish between copies of data stored in the primary volume and copies of updated data stored in the secondary volumes (P720, P730).

In one implementation, copies of data stored in the primary volume are prioritized over copies of updated data stored in one of the secondary volumes because the former are likely to be accessed by each of the computing systems in the network 150 during a boot sequence, while the latter are likely to be accessed by a single computing system (i.e., the computing system at which the secondary volume is stored) during a boot sequence. In such an implementation, the existing copy of data to be removed from the distributed cache system 160 is selected such that copies of data stored in the primary volume are retained in the distributed cache system 160, desirably, for as long as possible (P740).

Advantageously, the systems and methods provided above enable secure sharing and copying of data between computing systems in a peer-to-peer network. Moreover, the systems and methods provided above may improve latency in a network by increasing the access rate and availability of data in a scalable and efficient manner In different embodiments, the claimed subject matter may be implemented either entirely in the form of hardware or entirely in the form of software, or a combination of both hardware and software elements. For example, each of the computing systems 120, 130, 140, 220, 230, or 240 may comprise a controlled computing system environment that may be presented largely in terms of hardware components and software code executed to perform processes that achieve the results contemplated by the system of the claimed subject matter.

Figure 8:
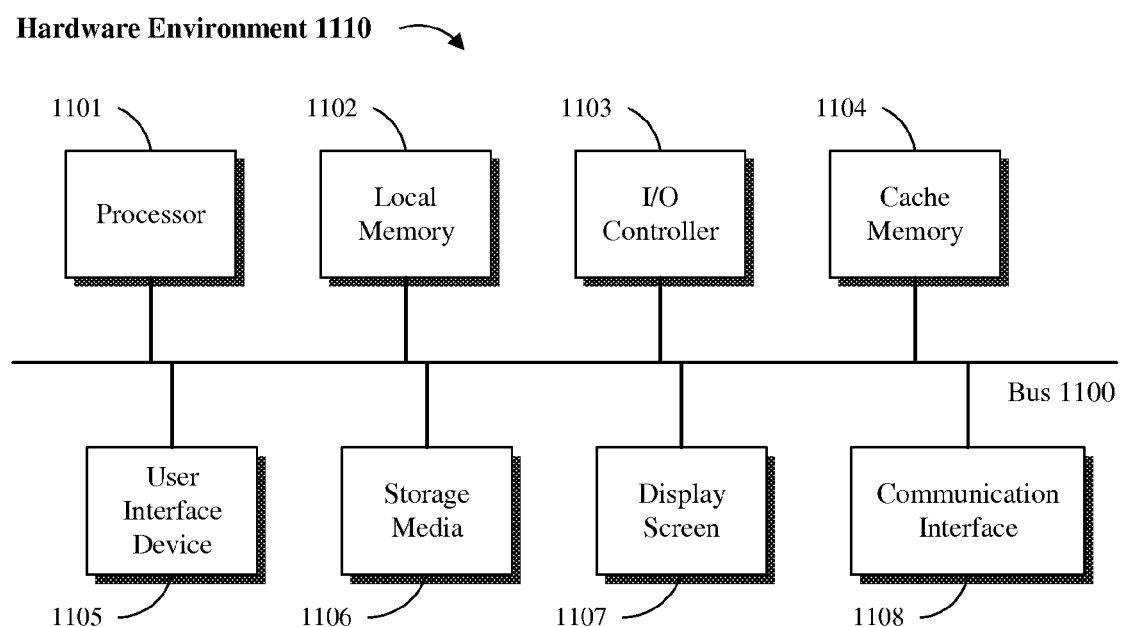
FIGS. 8 and 9 are block diagrams of hardware and software environments in which a system of the claimed subject matter may operate, in accordance with one or more embodiments.
Figure 9:
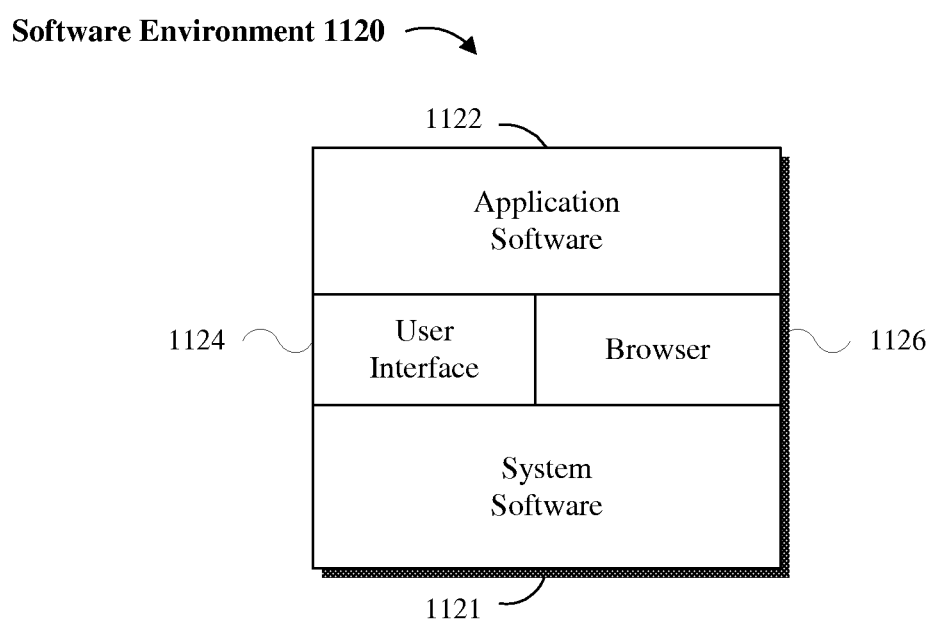

Referring to FIGS. 8 and 9, a computing system environment in accordance with an exemplary embodiment is composed of a hardware environment 1110 and a software environment 1120. The hardware environment 1110 comprises the machinery and equipment that provide an execution environment for the software; and the software environment 1120 provides the execution instructions for the hardware as provided below.

As provided here, software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, the distributed cache system 160 or 260 may be managed or utilized by system software 1121 or application software 1122 executed on one or more hardware environments to facilitate data storage management using a distributed cache scheme.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 8, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 9, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on a general computing system (not shown) and server software is executed on a server system (not shown).

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A computer-implemented method for accessing data stored in a distributed storage system, the method comprising:

maintaining a distributed storage system comprising a plurality of virtual machines executed on a plurality of computing systems connected over a network, wherein a portion of a respective data storage volume on each of the plurality of computing systems is allocated to one of the plurality of virtual machines executed on the respective computing system as a respective virtual memory, wherein upon addition of each of the plurality of computing systems to the network, determining whether there is sufficient free storage space on the respective computing system to be allocated to a distributed cache system implemented over the distributed storage system, the plurality of computing systems sharing free space in the virtual memories allocated to the plurality of virtual machines based on cache metadata identifying the amount of free storage space available on one or more of said plurality of computing systems;

determining, based on metadata associated with first data, whether a copy of the first data stored in one or more data storage volumes in a distributed storage system is stored in the distributed cache system implemented utilizing free storage space in said distributed storage system, in response to a first computing system receiving a request to access the first data stored in the one or more data storage volumes in the distributed storage system;

instead of accessing the first data stored in the one or more data storage volumes in the distributed storage system, accessing the copy of the first data from the distributed cache system, in response to determining that the copy of the first data is stored in a first data storage medium in a first cache locally associated with the first computing system instead of accessing the first data stored in the one or more data storage volumes in the distributed storage system, requesting a second computing system, other than the first computing system, in the network to access the copy of the first data from the distributed cache system, in response to determining that the copy of the first data is stored not in the first data storage medium in the first cache, but in a second data storage medium in a second cache locally associated with the second computing system; and accessing the first data from the one or more data storage volumes in the distributed storage system, in response to determining that the copy of the first data is not stored in the distributed cache system, wherein the distributed cache system comprises portions of the first data storage medium in the first cache and portions of the second data storage medium in the second cache utilized for caching data stored in the distributed storage system, wherein the cache metadata further comprises a mapping between the copy of the first data stored in the distributed cache system and the first data stored in the one or more data storage volumes in the distributed storage system, wherein the metadata is propagated among one or more computing systems supporting the distributed cache system to enable the first computing system to determine storage location of the first data in both the distributed cache system and the one or more data storage volumes in the distributed storage system, and to provide for the first data stored in the one or more data storage volumes in the distributed storage system to be updated when the copy of the first data stored in the distributed cache system is updated.

2. The method of claim 1, wherein the first data is accessed from the distributed storage system, further comprising determining whether the distributed cache system has sufficient storage space available to store the copy of the first data.

3. The method of claim 2, further comprising:

storing the copy of the first data in the first data storage medium at the first computing system, in response to determining that the first storage medium has sufficient memory available to store the copy of the first data; and requesting a third computing system in the network to store the copy of the first data in a third data storage medium at the third computing system, in response to determining that the first data storage medium has insufficient storage space available to store the copy of the first data while the third data storage medium has sufficient memory available to store the copy of the first data.

4. The method of claim 3, wherein the distributed cache system further comprises metadata identifying the third computing system and respective amount of storage space available at the third computing system.

5. The method of claim 2, further comprising removing a copy of second data stored in the distributed storage system from the distributed cache system prior to storing the copy of the first data in the distributed cache system, in response to determining that the distributed cache system has insufficient memory available to store the copy of the first data.

6. The method of claim 1, wherein the distributed storage system is configured to have a primary volume and one or more secondary volumes associated with the primary volume.

7. The method of claim 6, wherein copies of data stored in the primary volume are retained in the distributed cache system until a first event occurs.

8. The method of claim 7, wherein the distributed cache system further comprises metadata for distinguishing between the copies of data stored in the primary volume and copies of data stored in the secondary volumes.

9. The method of claim 1, wherein computing systems in the network satisfy one or more security conditions.

10. The method of claim 9, wherein access to data stored in the distributed storage system is limited to the computing systems in the network.

11. The method of claim 1, further comprising implementing a cache coherency protocol to prevent simultaneous access to the shared data by different processes.

12. The method of claim 1, wherein one or more of the computing systems in the network are virtual machines such that the distributed storage system comprises virtual memories allocated to the virtual machines.

13. A computer-implemented method for accessing data stored in a distributed storage system, the method comprising:
maintaining a distributed storage system comprising a plurality of virtual machines executed on a plurality of computing systems connected over a network, wherein a portion of a respective data storage volume on each of the plurality of computing systems is allocated to one of the plurality of virtual machines executed on the respective computing system as a respective virtual memory,
wherein upon addition of each of the plurality of computing systems to the network, determining whether there is sufficient free storage space on the respective computing system to be allocated to a distributed cache system implemented over the distributed storage system, the plurality of computing systems sharing free space in the virtual memories allocated to the plurality of virtual machines based on cache metadata identifying the amount of free storage space available on one or more of said plurality of computing systems;
determining, based on metadata associated with first data, whether a copy of first data in one or more data storage volumes in a distributed storage system is stored in a distributed cache system implemented utilizing free storage space in said distributed storage system, in response to a first virtual machine (VM) receiving a request to access the first data stored in the one or more data storage volumes in the distributed storage system;
instead of accessing the first data in the one or more data storage volumes in the distributed storage system, accessing the copy of the first data from the distributed cache system, in response to determining that the copy of the first data is stored in a first virtual memory associated with the first VM in the network;
instead of accessing the first data in the one or more data storage volumes in the distributed storage system, requesting a second VM in the network to access the copy of the first data from the distributed cache system, in response to determining that the copy of the first data is stored not in the first virtual memory, but in a second virtual memory associated with the second VM; and
accessing the first data from the one or more data storage volumes in the distributed storage system, in response to determining that the copy of the first data is not stored in the distributed cache system wherein the distributed cache system comprises portions of the first virtual memory and portions of the second virtual memory utilized for caching data stored in the distributed storage system,
wherein the cache metadata wherein the distributed cache system further comprises a mapping between the copy of the first data stored in the distributed cache system and the first data stored in the one or more data storage volumes in the distributed storage system, wherein the metadata is propagated among one or more VMs supporting the distributed cache system to enable the first VM to determine storage location of the first data in both the distributed cache system and the one or more data storage volumes in the distributed storage system, and to provide for the first data stored in the one or more data storage volumes in the distributed storage system to be updated when the copy of the first data stored in the distributed cache system is updated.

14. The method of claim 13, wherein the first data is accessed from the distributed storage system, further comprising determining whether the distributed cache system has sufficient storage space available to store the copy of the first data.

15. The method of claim 14, further comprising:
storing the copy of the first data in the first virtual memory allocated to the first VM, in response to determining that the first virtual memory has sufficient memory available to store the copy of the first data; and
requesting a third VM in the network to store the copy of the first data in a third virtual memory allocated to the third VM, in response to determining that the first virtual memory has insufficient storage space available to store the copy of the first data while the third virtual memory has sufficient memory available to store the copy of the first data.

16. The method of claim 15, wherein the distributed cache system further comprises metadata identifying the third VM and respective amount of storage space available at the third VM.

17. The method of claim 14, further comprising removing a copy of second data stored in the distributed storage system from the distributed cache system prior to storing the copy of the first data in the distributed cache system, in response to determining that the distributed cache system has insufficient memory available to store the copy of the first data.

18. The method of claim 14, wherein the distributed storage system is configured to have a primary volume and one or more secondary volumes associated with the primary volume.

19. The method of claim 18, wherein copies of data stored in the primary volume are retained in the distributed cache system until a first event occurs.

20. The method of claim 19, wherein the distributed cache system further comprises metadata for distinguishing between the copies of data stored in the primary volume and copies of data stored in the secondary volumes.

21. The method of claim 13, wherein VMs in the network satisfy one or more security conditions.

22. The method of claim 21, wherein access to data stored in the distributed storage system is limited to the VMs in the network.

23. The method of claim 13, further comprising implementing a cache coherency protocol to prevent simultaneous access to shared data by different processes.

24. A computer program product comprising a non-transitory data storage medium having logic code stored thereon, wherein the logic code when executed on a computer causes the computer to:
maintain a distributed storage system comprising a plurality of virtual machines executed on a plurality of computing systems connected over a network, wherein a portion of a respective data storage volume on each of the plurality of computing systems is allocated to one of the plurality of virtual machines executed on the respective computing system as a respective virtual memory,
wherein upon addition of each of the plurality of computing systems to the network, it is determined whether there is sufficient free storage space on the respective computing system to be allocated to a distributed cache system implemented over the distributed storage system, the plurality of computing systems sharing free space in the virtual memories allocated to the plurality of virtual machines based on cache metadata identifying the amount of free storage space available on one or more of said plurality of computing systems;

determine, based on metadata associated with first data, whether a copy of first data in one or more data storage volumes in a distributed storage system is stored in a distributed cache system implemented utilizing free storage space in said distributed storage system, in response to a first computing system receiving a request to access the first data stored in the distributed storage system;

instead of accessing the first data in the one or more data storage volumes in the distributed storage system, access the copy of the first data from the distributed cache system, in response to determining that the copy of the first data is stored in a first data storage medium designated for or locally connected to the first computing system;

instead of accessing the first data in the one or more data storage volumes in the distributed storage system, request a second computing system in the network to access the copy of the first data from the distributed cache system, in response to determining that the copy of the first data is stored not in the first data storage medium, but in a second data storage medium designated for or locally connected to the second computing system; and access the first data from the one or more data storage volumes in the distributed storage system, in response to determining that the copy of the first data is not stored in the distributed cache system, wherein the distributed cache system comprises portions of the first data storage medium and portions of the second data storage medium utilized for caching data stored in the distributed storage system, wherein the distributed cache system further comprises metadata providing a one-to-one mapping between the copy of the first data stored in the distributed cache system and the first data stored in the one or more data storage volumes in the distributed storage system to enable the first data stored in the distributed storage system to be updated when the copy of the first data stored in the distributed cache system is updated, wherein the cache metadata further comprises a mapping between the copy of the first data stored in the distributed cache system and the first data stored in the one or more data storage volumes in the distributed storage system, wherein the metadata is propagated among one or more computing systems supporting the distributed cache system to enable the first computing system to determine storage location of the first data in both the distributed cache system and the one or more data storage volumes in the distributed storage system, and to provide for the first data stored in the one or more data storage volumes in the distributed storage system to be updated when the copy of the first data stored in the distributed cache system is updated.

* * * * *